US012664020B2

(12) United States Patent
Gupta

(10) Patent No.: US 12,664,020 B2
(45) Date of Patent: Jun. 23, 2026

(54) APPARATUSES, METHODS, AND COMPUTER PROGRAM PRODUCTS FOR OPTIMIZED SUPPORT MANAGEMENT SLOT ALLOCATIONS

(71) Applicants: Atlassian PTY Ltd., Sydney (AU); ATLASSIAN US, INC., San Francisco, CA (US)

(72) Inventor: Rahul Gupta, Hyderabad (IN)

(73) Assignees: Atlassian PTY Ltd., Sydney (AU); ATLASSIAN US, INC., San Francisco, CA (US)

( * ) Notice: Subject to any disclaimer, the term of this patent is extended or adjusted under 35 U.S.C. 154(b) by 381 days.

(21) Appl. No.: 18/241,101

(22) Filed: Aug. 31, 2023

(65) Prior Publication Data

US 2025/0004835 A1 Jan. 2, 2025

Related U.S. Application Data

(60) Provisional application No. 63/511,117, filed on Jun. 29, 2023.

(51) Int. Cl.
G06F 9/50 (2006.01)

(52) U.S. Cl.
CPC ................................. G06F 9/5016 (2013.01)

(58) Field of Classification Search
CPC .................................................... G06F 9/5016
See application file for complete search history.

(56) References Cited

U.S. PATENT DOCUMENTS

| | | | | |
|---|---|---|---|---|
| 2010/0131959 A1* | 5/2010 | Spiers | ...................... | G06F 9/50 |
| | | | | 718/105 |
| 2016/0021011 A1* | 1/2016 | Vasseur | ................. | H04W 72/52 |
| | | | | 370/235 |
| 2017/0178080 A1* | 6/2017 | Abebe | ................... | G06F 16/383 |
| 2024/0354261 A1* | 10/2024 | Tsirkin | ................ | G06F 12/1081 |

* cited by examiner

*Primary Examiner* — Wissam Rashid
(74) *Attorney, Agent, or Firm* — ALSTON & BIRD LLP

(57) ABSTRACT

An apparatus is configured to receive a first plurality of directive data structures, each directive data structure of the first plurality of directive data structures including a one or more first support control requirements associated with a supported platform and allocation of resources to a support matrix associated with the supported platform, the support matrix including a plurality of slots. The apparatus is further configured to allocate one or more resource data structures of a plurality of resource data structures to one or more of the plurality of slots of the support matrix according to the first plurality of directive data structures, and receive a slot allocation compliance matrix, where the slot allocation compliance matrix includes one or more compliance indications associated with the plurality of slots. The apparatus is further configured to apply a trained slot allocation machine learning model to the slot allocation compliance matrix and the support matrix to generate a second plurality of directive data structures.

14 Claims, 10 Drawing Sheets

500

501

Receive a first plurality of directive data structures

502

Allocate one or more resource data structures to one or more slots of a plurality of slots of a support matrix according to the first plurality of directive data structures

503

Receive a slot allocation compliance matrix associated with the support matrix

504

Apply a trained slot allocation machine learning model to the slot allocation compliance matrix and the support matrix to generate a second plurality of directive data structures

505

Allocate one or more resource data structures to one or more of a second plurality of slots of a second support matrix according to the second plurality of directive data structures

Receive a first slot allocation request associated with a support matrix

602

Allocate one or more resource data structures to one or more slots of the support matrix based at least in part on a trained slot allocation machine leaning model

700

```
┌──────────────────────────────────────────────────────┐
│  Receive a plurality of resource data structures and   │   701
│  a plurality of directive data structures from one or  │
│  more datastores                                       │
└──────────────────────────────────────────────────────┘
                          │
                          ▼
┌──────────────────────────────────────────────────────┐
│  Generate a first training set comprising the          │   702
│  plurality of resource data structures and the         │
│  plurality of directive data structures                │
└──────────────────────────────────────────────────────┘
                          │
                          ▼
┌──────────────────────────────────────────────────────┐
│  Generate a trained slot allocation machine learning   │   703
│  model by training a slot allocation machine learning  │
│  model, in a first stage, using the first training set │
└──────────────────────────────────────────────────────┘
                          │
                          ▼
┌──────────────────────────────────────────────────────┐
│  Receive a slot allocation compliance matrix           │   704
└──────────────────────────────────────────────────────┘
                          │
                          ▼
┌──────────────────────────────────────────────────────┐
│  Generate a second training set comprising the first   │   705
│  training set and one or more slots of a support       │
│  matrix without a compliance confirmation in the slot  │
│  allocation compliance matrix after the first stage    │
└──────────────────────────────────────────────────────┘
                          │
                          ▼
┌──────────────────────────────────────────────────────┐
│  Train the trained slot allocation machine learning    │   706
│  model in a second stage using the second training set │
└──────────────────────────────────────────────────────┘
                          │
                          ▼
┌──────────────────────────────────────────────────────┐
│  Apply the trained slot allocation machine learning    │   707
│  model to allocate resource identifiers to resource    │
│  slots                                                 │
└──────────────────────────────────────────────────────┘
```

FIG. 7A

APPARATUSES, METHODS, AND COMPUTER PROGRAM PRODUCTS FOR OPTIMIZED SUPPORT MANAGEMENT SLOT ALLOCATIONS

CROSS-REFERENCE TO RELATED APPLICATIONS

The present application claims priority to U.S. Provisional Application Ser. No. 63/511,117, titled "APPARATUSES, METHODS, AND COMPUTER PROGRAM PRODUCTS FOR OPTIMIZED SUPPORT MANAGEMENT SLOT ALLOCATIONS," filed Jun. 29, 2023, the contents of which are incorporated herein by reference in their entirety.

BACKGROUND

Complexities arise with respect to allocating resources to slots of a platform management matrix, where the complexities are associated with ensuring a given level of support while also maintaining reasonable distribution of resources. Through applied effort, ingenuity, and innovation, these identified deficiencies and problems have been solved by developing solutions that are configured in accordance with the embodiments of the present disclosure, many examples of which are described in detail herein.

BRIEF SUMMARY

In an embodiment, an apparatus is configured to receive a first plurality of directive data structures, each directive data structure of the first plurality of directive data structures including one or more first support control requirements associated with a supported platform and allocation of resources to a support matrix associated with the supported platform, the support matrix including a plurality of slots. The apparatus is further configured to allocate one or more resource data structures of a plurality of resource data structures to one or more of the plurality of slots of the support matrix according to the first plurality of directive data structures, and receive a slot allocation compliance matrix, where the slot allocation compliance matrix includes one or more compliance indications associated with the plurality of slots. The apparatus is further configured to apply a trained slot allocation machine learning model to the slot allocation compliance matrix and the support matrix to generate a second plurality of directive data structures.

In an embodiment, an apparatus is configured to receive a first slot allocation request associated with a support matrix, and, based at least in part on a trained slot allocation machine learning model, a slot allocation compliance matrix, the support matrix, and a plurality of directive data structures, allocate one or more resource data structures to one or more slots of the support matrix.

In an embodiment, an apparatus is configured to receive a plurality of resource data structures and a plurality of directive data structures from one or more datastores. The apparatus is further configured to generate a first training set comprising the plurality of resource data structures and the plurality of directive data structures. The apparatus is further configured to generate a trained slot allocation machine learning model by training a slot allocation machine learning model, in a first stage, using the first training set. The apparatus is further configured to receive a slot allocation compliance matrix. The apparatus is further configured to generate a second training set comprising the first training set and one or more slots of a support matrix without a compliance confirmation in the slot allocation compliance matrix after the first stage. The apparatus is further configured to train the trained slot allocation machine learning model in a second stage using the second training set.

Computer program products and computer-implemented methods are also described. Various other embodiments are also described in the following detailed description and in the attached claims.

BRIEF DESCRIPTION OF THE SEVERAL VIEW OF THE DRAWINGS

Having thus described some embodiments in general terms, references will now be made to the accompanying drawings, which are not drawn to scale, and wherein:

FIGS. 5A and 5B depict example operations for allocating resource identifiers to a platform management or support matrix based on directive data structures, in accordance with various embodiments of the present disclosure;

Figure 6A:
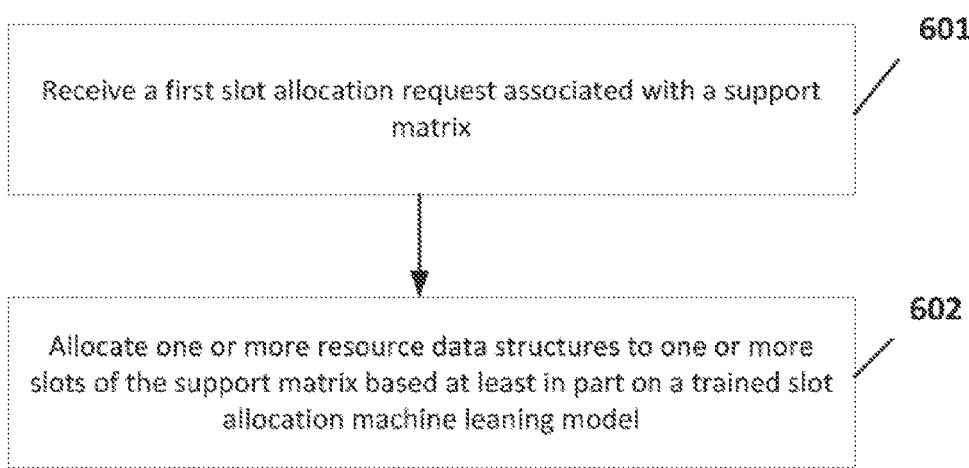
Figure 6B:
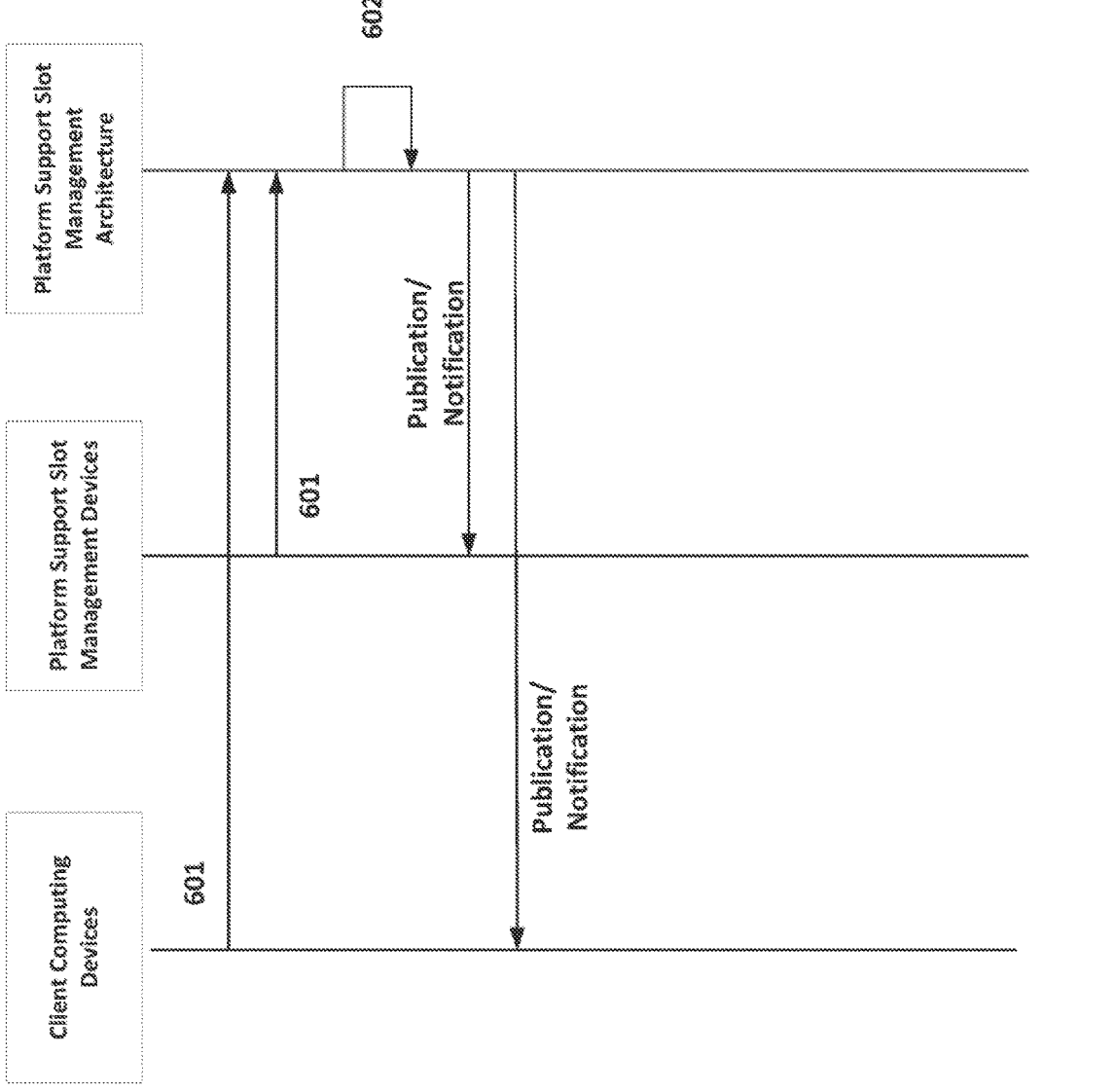
Figure 7B:
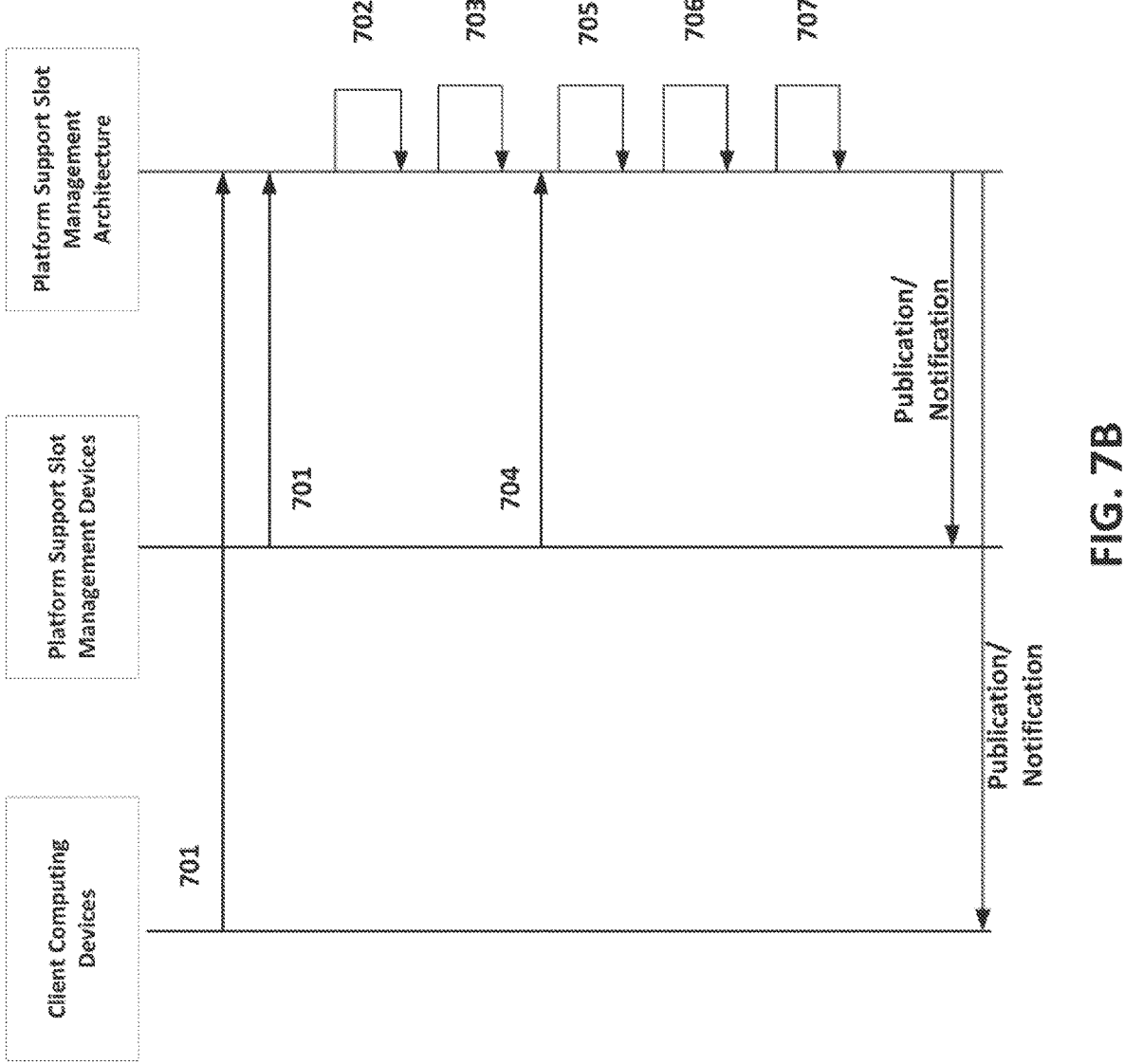

FIGS. 6A and 6B depict example operations for allocating resource identifiers to a platform management or support matrix based on directive data structures, in accordance with various embodiments of the present disclosure; and FIGS. 7A and 7B depict example operations for multiple training stages of a trained slot allocation machine learning model, in accordance with various embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Embodiments of the present disclosure address technical problems associated with efficiently and reliably managing platform support management for enterprise-level software applications and services. More specifically, various embodiments of the present disclosure relate to a platform support slot management platform configured to incorporate balancing conditions and adapt directives for slot allocations based on various learnings, compliance, and metrics associated with individuals accommodating the slot allocations.

An application framework (e.g., a cloud application framework) can be characterized by a large number of the application components (e.g., services, micro services, and the like) that are offered by the application framework. One example application framework might include an enterprise instance of Jira®, an action tracking and project management software platform, developed by Atlassian Pty. Ltd. that may be licensed to another corporation or entity. Other software platforms may serve as application frameworks (e.g., Confluence®, Trello®, Bamboo®, Clover®, Crucible®, etc. by Atlassian Pty. Ltd).

Modern application frameworks are designed to possess complex service architectures and are deployed at scale to large enterprise user bases. Because of this scale and the numerosity of the application components, a large number of data objects may be generated by the application framework at most any time interval. These created data objects may be generated for a variety of purposes and can be difficult to manage due to the sheer volume data objects and due to the complexity of the application framework. Allocating resources to managing created data objects is fraught with complexities and mistakes due to over-allocating resources to slots associated with services that are not receiving a large volume of data objects, under-allocating resources to slots associated with services that are receiving a large volume of data objects, and mis-allocating resources to slots in an unequal fashion.

Data objects generated and/or processed by an application framework may relate to the application framework itself such as, for example, data objects indicating service tickets, service messages, workflow action, software events, incidents, changes, component requests, alerts, notifications, and/or other data. Data objects generated and/or processed by an application framework may also relate to information technology service management software that a business or enterprise has deployed or licensed in association with the application framework for managing service tickets, service messages, workflow actions, software events, incidents, changes, component requests, alerts, notifications, and/or other data, and the like. Example information technology service management software includes Jira Service Management™ and/or Opsgenie™ by Atlassian Pty. Ltd. Notably, data objects may be transmitted via multiple types of communication channels such as, for example, email, application portals, widgets, chat channels, application programming interface (API) calls, etc. As an example, a data object may be related to a service ticket (e.g., a service management ticket) for a service request by a user (e.g., a help seeker user). Such a data object related to a service ticket may trigger routing to one or more system resources and/or application components of the application framework to provide a resolution for the service ticket.

Platform support management systems (e.g., such as an IT Service Management System or ITSM) must allocate resources according to time slots, service level agreements (SLA), number of users, roles and skills of human team members, volume of alerts (e.g., tickets or data objects), and various other factors associated with the application framework and associated data objects described above supported by the platform management systems. Allocation of resources includes allocation of human resources to time slots, and can be allocated according to various directives defined by the enterprise. Example directives may be aimed at creating an equitable distribution of slots while also providing required level of service according to an SLA, but may be hindered by physical limitations associated with the individuals assigned to the slots. Setting up allocation of resources for management of service operations is an involved exercise where individual team members must collaborate regarding what constitutes equitable distribution of slot allocations and track adherence to them. Thus, adherence to directives, and assessment of team health continues to be a manual process outside of the platform support management systems.

Embodiments herein overcome the aforementioned drawbacks associated with platform support management systems and more by providing a digital mechanism for platform support management systems to define the directives that govern support slot allocations. Embodiments herein provide for adapting and generating directives based on learned slot allocation compliance, defining directives (e.g., whether manual, using templates, and/or leveraging recommendations) based on multiple parameters such as time, roles, skills, number of human resources available for governing health and team balance, gathering on-call slot allocations, compliance logs for generating insights against directives, and automated reports generation (e.g., recommendations) against directives for health assessment.

Embodiments herein provide for collection of on-call time slot allocation data and actual presence data (e.g., compliance with the on-call time slot allocation data) to automatically generate reports and analytical insights against the directives used to generate the on-call time slot allocation data. Embodiments further provide report templates against each of the directive (or set of directives) templates so that the human effort to configure reports is highly reduced. Embodiments also provide a recommendation engine that leverages the data of schedules (e.g., support matrices) to recommend reports and analytics for team health. The recommendation engine is configured to learn from past data to adapt per the team (admin and members) schedule management.

In providing a learning engine for adapting directives and slot allocation, embodiments herein ensure a distributed slot allocation scheme for platform support management systems that eliminates system downtime (e.g., and risks associated with failure to comply with SLA-related requirements) that may result from manual intervention and the guesswork associated with how to properly allocate resources to support slots.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "server computing device" refers to a combination of computer hardware and/or software that is configured to provide a component to a client device. An example of a server computing device is the platform support management system 101 of FIG. 1. Another example of a server computing device is, in certain embodiments, the platform support slot management device 106 of FIG. 1. In some embodiments, a server computing device communicates with one or more client computing devices using one or more computer networks.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The terms "application framework" and "supported platform" refer to a computing environment associated with one or more computing devices and one or more components (e.g., one or more application components), where the environment enables interactions with respect to components supporting at least one application. For example, an application framework can be a system (e.g., a server system, a cloud-based system, an enterprise system, etc.) where multiple components, multiple resources associated with components, multiple layers of components, and/or multiple layers of resources interact with one another in several complex manners. In some embodiments, the components are associated directly or indirectly with an application supported by the components. In some embodiments, the components can support the application over one or more communication networks. The application framework can include one or more components to generate and update a repository of collected information for each component (e.g., an event object repository). Accordingly, the application framework can provide for the collection of information, in the form of service event objects, to facilitate monitoring of service event streams associated with one or more components of the application framework. In certain embodiments, the application framework can be configured as a service management software platform. In certain embodiments, the application framework can alternatively be configured to manage one or more project management applications, one or more work management applications, one or more software development applications, one or more product development applications, one or more portfolio management applications, one or more collaborative applications, or one or more other types of applications. In certain embodiments, the application framework can be configured as an enterprise instance of an information technology service management software platform. However, it is to be appreciated that, in other embodiments, the application framework can be configured as another type of component platform.

The term "application framework system" refers to a system that includes both a server framework and a repository to support the server framework. For example, an application framework refers to a system that includes a computing environment associated with one or more computing devices and one or more components, as well as a repository of collected information for each component and/or each computing device.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application can be supported by one or more components either via direct communication with the component or indirectly by relying on a component that is in turn supported by one or more other components.

The term "component" or "component application" refers to a computer functionality or a set of computer functionalities, such as the retrieval of specified information or the execution of a set of operations, with a purpose that different clients can reuse for their respective purposes, together with the policies that should control its usage, for example, based on the identity of the client (e.g., an application, another component, etc.) requesting the component. Additionally, a component may support, or be supported by, at least one other component via a component dependency relationship. For example, a translation application stored on a smartphone may call a translation dictionary component at a server in order to translate a particular word or phrase between two languages. In such an example the translation application is dependent on the translation dictionary component to perform the translation task.

In some embodiments, a component is offered by one computing device over a network to one or more other computing devices. Additionally, the component may be stored, offered, and utilized by a single computing device to local applications stored thereon and in such embodiments a network would not be required. In some embodiments, components may be accessed by other components via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, components may be configured to capture or utilize database information and asynchronous communications via message queues (e.g., Event Bus). Non-limiting examples of components include an open source API definition format, an internal developer tool, web based HTTP components, databased components, and asynchronous message queues which facilitate component-to-component communications.

In some embodiments, a component can represent an operation with a specified outcome and can further be a self-contained computer program. In some embodiments, a component from the perspective of the client (e.g., another component, application, etc.) can be a black box (e.g., meaning that the client need not be aware of the component's inner workings). In some embodiments, a component may be associated with a type of feature, an executable code, two or more interconnected components, and/or another type of component associated with an application framework.

In some embodiments, a component may correspond to a service. Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an application framework.

The term "service" refers to a type of component. In some embodiments, a service provides a visual representation of one or more data structures. In some embodiments, a service is configured for viewing data, searching for data, creating data, updating data, managing relationships among data, assigning attributes related to data, and/or storing data associated with one or more data structures. In some embodiments, a service is configured as a system, tool or product to facilitate viewing data, searching for data, creating data, updating data, managing relationships among data, assigning attributes related to data, and/or storing data associated with one or more data structures. In some embodiments, a service comprises a set of metadata attributes associated with a technical capability, a technical configuration, an application capability, an application configuration, and/or another metadata attribute. In some embodiments, a service is published to one or more client devices via one or more APIs. In some embodiments, a service is a logical representation of an application stack. In some embodiments, a service corresponds to one or more microservices.

The term "microservices" refers to a set of services that are interconnected and independently configured to provide a monolith service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service.

The term "library" refers to a collection of objects (e.g., a collection of component objects, a collection of service objects, etc.), a collection of functions, and/or a collection of processing threads associated with one or more components.

The term "workflow" refers to a set of actions that represent one or more processes related to an application framework and/or one or more components. A workflow can include a set of statuses and/or a set of transitions that represent one or more processes. For example, a status can represent a state of an action and/or a task performed with respect to an application framework and/or one or more components. A transition can represent a link between status. Actions for a workflow can be configured to dynamically alter a current status of a workflow and/or to initiate a transition.

The term "service workflow event" refers to one or more actions, interactions with, and/or one or more changes related to a service workflow of an application framework and/or one or more components. In one or more embodiments, a service workflow event refers to one or more actions, interactions with, and/or one or more changes related to one or more service management applications, one or more project management applications, one or more work management applications, one or more software development applications, one or more product development applications, one or more portfolio management applications, one or more collaborative applications, or one or more other types of applications. In some embodiments, a service workflow event may be associated with metadata, a unique identifier, one or more attributes, one or more features, one or more tags, one or more source identifiers, one or more object types, and/or other context data. In some embodiments, a service workflow event may be related to and/or triggered via one or more client devices that interact with one or more components. For example, in some embodiments, a service workflow event can be related to one or more service requests initiated via a display screen of a client device. Additionally or alternatively, in some embodiments, a service workflow event may be triggered via one or more components and/or one or more user identifiers. In some embodiments, a service workflow event may be associated with a service workflow event stream.

The term "service workflow event stream" refers to a collection of service workflow events related to one or more components and/or one or more user identifiers. For example, a service workflow event stream can include a first service workflow event associated with at least one component, a second service workflow event associated with the at least one component, a third service workflow event associated with the at least one component, etc. In certain embodiments, a service workflow event stream refers to a collection of service workflow events related to a service management application, a project management application, a work management application, a software development application, a product development application, a portfolio management application, a collaborative application, or another type of application. In certain embodiments, a service workflow event stream can include one or more service message objects related to one or more service workflow events.

The term "user identifier" refers to one or more items of data by which a particular user of the application framework may be uniquely identified. For example, a user identifier can correspond to a particular set of bits or a particular sequence of data that uniquely identifies a user. In various embodiments, a user identifier corresponds to a user that is authorized to view, edit and/or work simultaneously on one or more workflows related to a project management application, a work management application, a service management application, a software development application, a product development application, a portfolio management application, a collaborative application, or another type of application.

The terms "internal component," "internal resource," or similar terms refer to a program, application, platform, or component that is configured by a developer to provide functionality to another one or more of their programs, applications, platforms, or components, either directly or indirectly through one or more other components, as opposed to using an external component. Internal components operate on a compiled code base or repository that is at least partially shared by an application which utilizes the functionality provided by the internal component. In some embodiments, the application code base and the internal component code base are hosted on the same computing device or across an intranet of computing devices. An application communicates with internal components within a shared architectural programming layer without external network or firewall separation. In some embodiments, an internal component is used only within the application layer which utilizes the internal components functionality. Information related to internal components can be collected and compiled into component objects which can also be referred to as internal component objects. An example embodiment of an internal component is a load balancer configured for routing and mapping API and/or component locations. Internal components may be configured for information-based shard routing, or in other words, routing and mapping API and/or component locations based on predefined custom component requirements associated with an application. For example, an internal component may be configured to identify where communication traffic originates from and then reply to the communications utilizing another component for reply communication.

The terms "external component," "external resource," "remote resource," or similar terms refer to a program, application, platform, or component that is configured to communicate with another program, application, platform, or component via a network architecture. In some embodiments, communications between an external component and an application calling the external component takes place through a firewall and/or other network security features. The external component operates on a compiled code base or repository that is separate and distinct from that which supports the application calling the external component. The external components of some embodiments generate data or otherwise provide usable functionality to an application calling the external component. In other embodiments, the application calling the external component passes data to the external component. In some embodiments, the external component may communicate with an application calling the external component, and vice versa, through one or more application program interfaces (APIs). For example, the application calling the external component may subscribe to an API of the external component that is configured to transmit data. In some embodiments, the external component receives tokens or other authentication credentials that are used to facilitate secure communication between the external component and an application calling the external component in view of the applications network security features or protocols (e.g., network firewall protocols). An example embodiment of an external component may include cloud components (e.g., AWS®).

The term "interface element" refers to a rendering of a visualization and/or human interpretation of data associated with an application framework and/or a distributed ledger system. In one or more embodiments, an interface element may additionally or alternatively be formatted for transmission via one or more networks. In one or more embodiments, an interface element may include one or more graphical elements and/or one or more textual elements.

The term "visualization" refers to visual representation of data to facilitate human interpretation of the data. In some embodiments, visualization of data includes graphic representation and/or textual representation of data.

The term "communication channel" refers to a wired or wireless transmission medium for transmitting data between a client device and an application framework system. To communicatively couple a client device and an application framework system, a communication channel can be integrated with a component management interface, an API, a communication interface. In an example, the communication channel can be a network communication channel that communicatively couples a client device and an application framework. A communication channel can be related to a portal, chat, email, web, widget, API call, text, notification, telephone, video, and/or other type of communication. In various embodiments, a communication channel can be configured for transmitting messages and/or signals such as, for example, service messages or service signals, between a client device and an application framework.

The term "service message object" refers to a data structure that represents at least a portion of a service message related to a service request for the application framework system. The service message object can take the structural form of a vector or other appropriate data structure for representing a service message. Additionally, a service message object can be received by one or more computing devices (e.g., servers, systems, platforms, etc.) which are configured to cause an application framework system to perform one or more actions associated with one or more service event workflows and/or one or more components of the application framework system.

The service message object may be received by an application framework system via a communication channel or the like. In one or more embodiments, the service message object may be generated by a client device via one or more computer program instructions. In various embodiments, a service message object can be generated via a service ticket, a service message, a service request, a service conversation, an API call, an application portal, a chat message conversation, an email exchange, a web interface, a widget interface, a workflow, a collaborative dashboard, a service management application, a project management application, a work management application, a software development application, a product development application, a portfolio management application, a collaborative application, or another type of process related to an application framework. Additionally or alternatively, a service message object may be cause one or more actions, one or more changes, and/or one or more authorizations with respect to a service ticket, a service message, a service request, a service conversation, an API call, an application portal, a chat message conversation, an email exchange, a web interface, a widget interface, a workflow, a collaborative dashboard, a service management application, a project management application, a work management application, a software development application, a product development application, a portfolio management application, a collaborative application, or another type of process related to an application framework.

The term "response message object" refers a data structure that represents at least a portion of a response message generated in response to a service request for the application framework system. The response message object can take the structural form of a vector or other appropriate data structure for representing a response message. Additionally, a response message object can be received by one or more client devices which provided a related service message object. In various embodiments, a response message object is generated by a virtual agent system to obtain additional information related to a related service message object.

The term "resolution data object" refers to a data structure that represents one or more resolution actions for a service message object. A resolution data object can include and/or be configured as a message, an alert, a notification, a control signal, an API call, an email message, an application portal communication, a widget communication, a chat channel communication, a web communication, API calls, a set of executable instructions, a workflow, a resolution ticket, visual data, the like, or combinations thereof. In certain embodiments, a resolution action can be performed with respect to an application framework system. For example, a resolution action can be associated with one or more workflow events with respect to one or more components of an application framework. In certain embodiments, a resolution action can be associated with one or more workflow events with respect to one or more service management applications, one or more project management applications, one or more work management applications, one or more software development applications, one or more product development applications, one or more portfolio management applications, one or more collaborative applications, or one or more other types of applications managed by an application framework. In certain embodiments, a resolution action can be performed with respect to a client device, a support device, or another type of computing device. In certain embodiments, a resolution action can be performed with respect to a user interface of a client device, a support device, or another type of computing device to render visual data associated with a respective resolution data object.

The term "directive data structure" refers to a structured data object containing one or more records of data representative of support control requirements associated with generating a support matrix for an application framework.

The term "support control requirement" refers to a limit or condition placed on the allocation of resource identifiers to slots of a support matrix. For example, a support control requirement may mandate that each team member should manage service operations for at least 1 weekend in a month; or that every team member with a particular role should manage operations for at least once in night hours per week; or that every team member should manage operations for at least 12 hours in a single stretch twice a month.

The terms "support matrix" and "platform support matrix" refer to a multi-dimensional data object comprising a plurality of slots for allocating resource identifiers for supporting requests associated with a service provided by an application framework.

The term "resource data structure" refers to a structured data object, sometimes having multiple records, associated with a given resource (e.g., human support member).

The term "resource identifier" refers to one or more items of data by which a resource may be uniquely identified.

The term "resource metadata" refers to one or more items of data associated with a resource identifier, such as one or more resource roles and/or one or more resource skills.

The term "resource role" refers to refers to one or more items of data representative of one or more roles relevant to supporting an application framework associated with a resource identifier.

The term "resource skill" refers to one or more items of data representative of skills relevant to supporting an application framework associated with a resource identifier.

The term "service identifier" refers to one or more items of data by which a service may be uniquely identified.

The term "slot allocation compliance matrix" refers to a multi-dimensional data structure comprising a plurality of records, where each record is representative of whether a resource assigned to a given slot of a support matrix complied with the allocation (e.g., was the resource present for the duration of network time associated with the allocation).

The term "resource grouping" refers to a data structure comprising a plurality of resource identifiers and a service identifier. A resource grouping, in some examples, is a team created for the purpose of supporting requests associated with one or more services of an application framework.

The term "directive visibility flag" refers to an item of data associated with one or more records of a directive data structure indicative of whether any given directive is visible to users other than a resource grouping administrator.

The term "slot allocation request" refers to an electronic data object representative of a request to allocate one or more resource identifiers to one or more slots of a platform management matrix according to one or more directives.

The term "trained slot allocation machine learning model" refers to one or more data objects representative of a model definition specifically configured to allocate resource identifiers to slots of a support matrix in accordance with directive data structures and learnings based thereon.

The terms "trained machine learning model," "machine learning model," "model," "one or more models," or "ML" refer to a machine learning or deep learning task or mechanism. Machine learning is a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting may include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network). In some embodiments, the model can be trained and/or trained in real-time (e.g., online training) while in use.

The machine learning models as described herein may make use of multiple ML engines, e.g., for analysis, transformation, and other needs. The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models may be some form of neural network. The underlying ML models may be learning models (supervised or unsupervised). As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

Alternatively, ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or autoencoders).

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein. The ML models herein may undergo a second or multiple subsequent training phases for retraining the models.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, virtual reality device, augmented reality device, the like, or any combination of the aforementioned devices.

Figure 1:
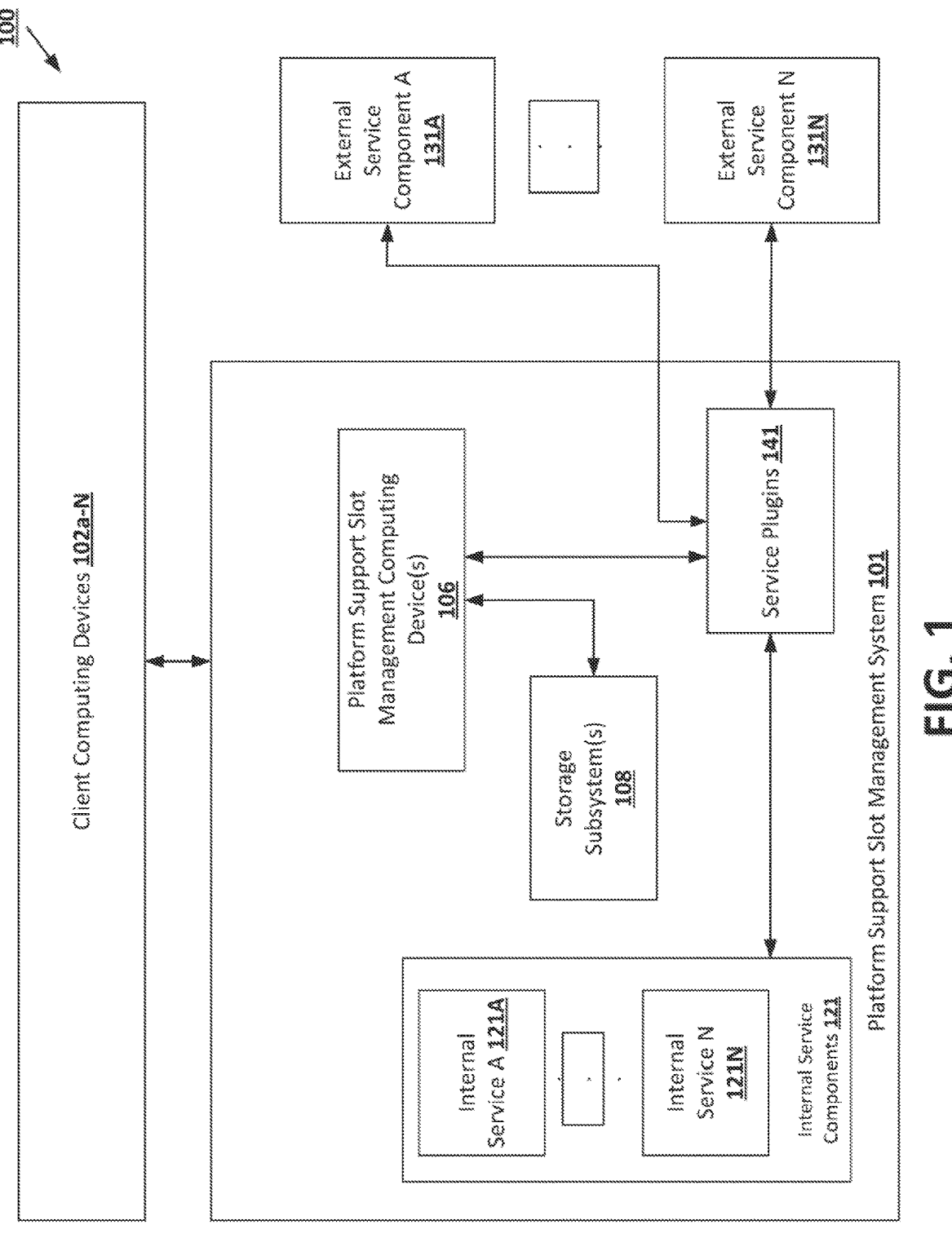
FIG. 1 is a block diagram of an example system within which one or more embodiments of the present disclosure may operate.

FIG. 1 illustrates an example system architecture 100 within which embodiments of the present disclosure may operate. The system architecture 100 includes a platform support slot management system 101 configured to interact with one or more client devices 102a-n, such as client device 102a, client device 102b, and/or client device 102n. In one or more embodiments, the one or more client devices 102a-n may be configured to interact with one or more components managed by an application framework (now shown) of an application framework system (not shown) supported by the platform support slot management system 101. For example, in one or more embodiments, the one or more client devices 102a-n may be configured to send data to the one or more components managed by the application framework and/or receive data from the one or more components managed by the application framework. In one or more embodiments, the one or more components can be related to one or more service messages, one or more service requests, one or more service tickets, one or more service conversations, one or more notifications, one or more workflows, a collaborative IT service management document, a collaborative IT service management dashboard, collaborative software management, and/or another type of application provided by the application framework 106.

The system architecture 100 also includes a platform support slot management computing device 106. In various embodiments, the platform support slot management computing device 106 can also be configured to interact with the one or more client devices 102a-n. In one or more embodiments, the platform support slot management computing device 106 can include one or more AI models, and/or a resolution engine 116.

The platform support management system 101 and/or the one or more client devices 102a-n may be in communication using a network (not shown). The network may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network (e.g., network routers, etc.). For example, the network may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a WebSocket channel. In some embodiments, the protocol is JSON over RPC, JSON over REST/HTTP, the like, or combinations thereof.

A client device from the one or more client devices 102a-n may include a mobile device, a smart phone, a tablet computer, a laptop computer, a wearable device, a personal computer, an enterprise computer, a virtual reality device, an augmented reality device, or another type of computing device. In certain embodiments, at least one client device from the one or more client devices 102a-n can be a support device or another type of computing device configured for consuming resolution data objects and/or data associated therewith. In one or more embodiments, a client device from the one or more client devices 102a-n includes geolocation circuitry configured to report a current geolocation of the client device. In some embodiments, the geolocation circuitry of the client device may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry of the client device may be configured to infer an indoor geolocation and/or a sub-structure geolocation of the client device using signal acquisition and tracking and navigation data decoding, where the signal acquisition and tracking and the navigation data decoding is performed using GPS signals and/or GPS-like signals (e.g., cellular signals, etc.). Other examples of geolocation determination include Wi-Fi triangulation and ultra-wideband radio technology.

In one or more embodiments, the platform support slot management system 101 may be configured to receive one or more service message objects from one or more of the client devices 102a-n. A service message object can be configured to cause one or more actions with respect to the application framework or the platform support slot management system 101. For example, a service message object can be configured to cause one or more actions with respect to one or more workflows managed by the application framework. A service message object may be generated by the one or more client devices 102a-n and may be received via a communication channel associated with the application framework, a component management interface of the application framework, an API of the application framework, a communication interface of the application framework, the like, or combinations thereof. The communication channel can be related to a portal, widget, chat, email, web, text, notification, telephone, video, and/or other type of communication. Based on the one or more service message objects, the application framework system may perform one or more actions with respect to the application framework.

In various embodiments, the platform support management system 101 may include a storage subsystem 108. The storage subsystem 108 may include one or more storage units, such as multiple distributed storage units that are connected through a computer network. Moreover, each storage unit in the storage subsystem 108 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

In various embodiments, the system 101 may be configured to ingest, normalize, and aggregate service management requests across a plurality of service components comprising one or more internal service components 121 and one or more external service components 131A-N.

Exemplary Platform Support Slot Management Computing Device

Figure 2:
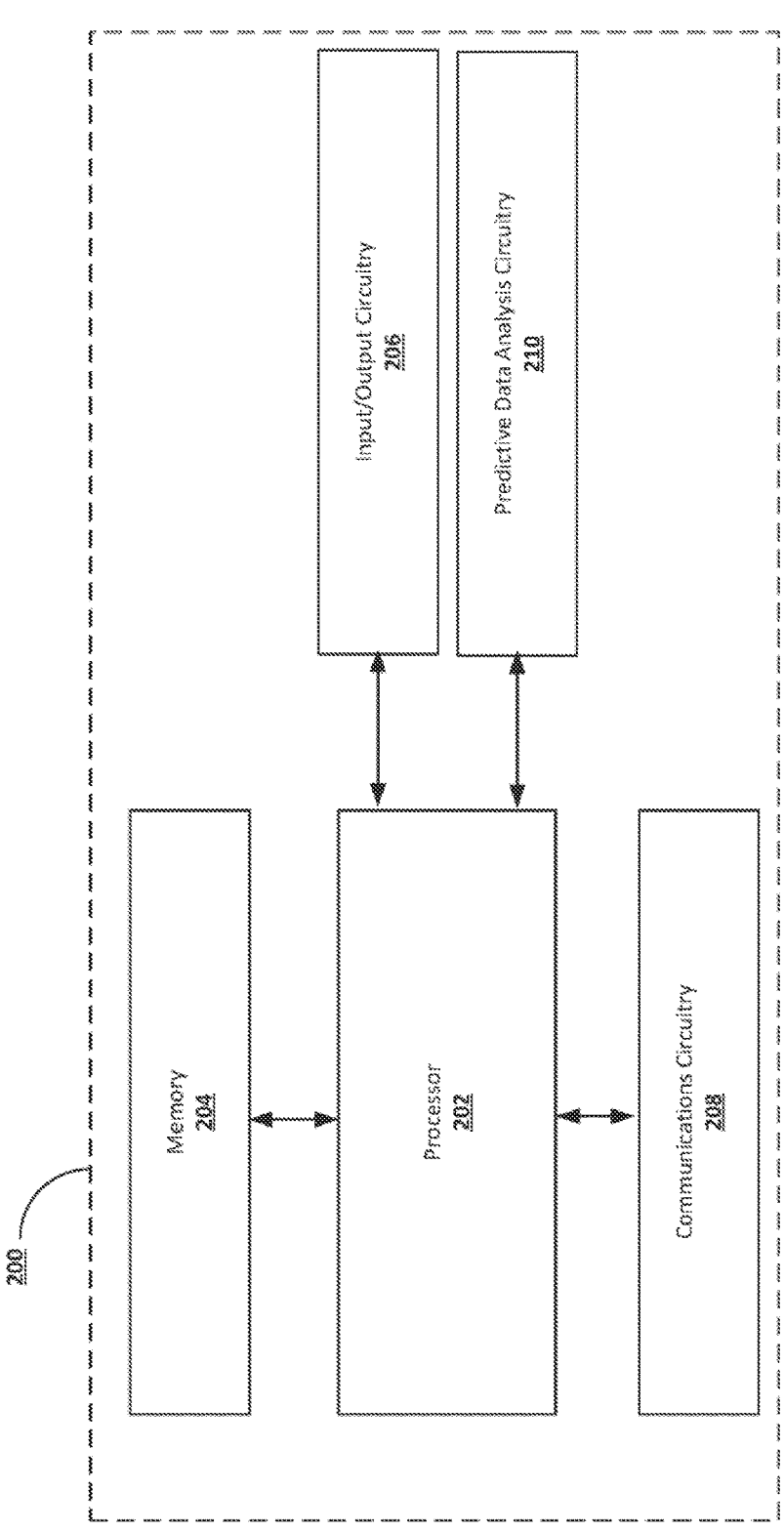
FIG. 2 is a block diagram of a platform support slot management computing device configured in accordance with one or more embodiments of the present disclosure.

The platform support slot management computing device 106 may be embodied by one or more computing systems, such as apparatus 200 shown in FIG. 2. The apparatus 200 may include processor 202, memory 204, input/output circuitry 206, communications circuitry 208, and a predictive data analysis circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The predictive data analysis circuitry 210 may be any means such as a device or circuitry embodied in either hardware or a combination of hardware and software that is configured to perform predictive data analysis operations (e.g., using ML and/or NLP models). For example, the predictive data analysis circuitry 210 may include specialized circuitry that are configured to perform machine learning operations in an expediated manner, such as graphical processing unit (GPU) circuitry and/or tensor processing unit (TPU) circuitry.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
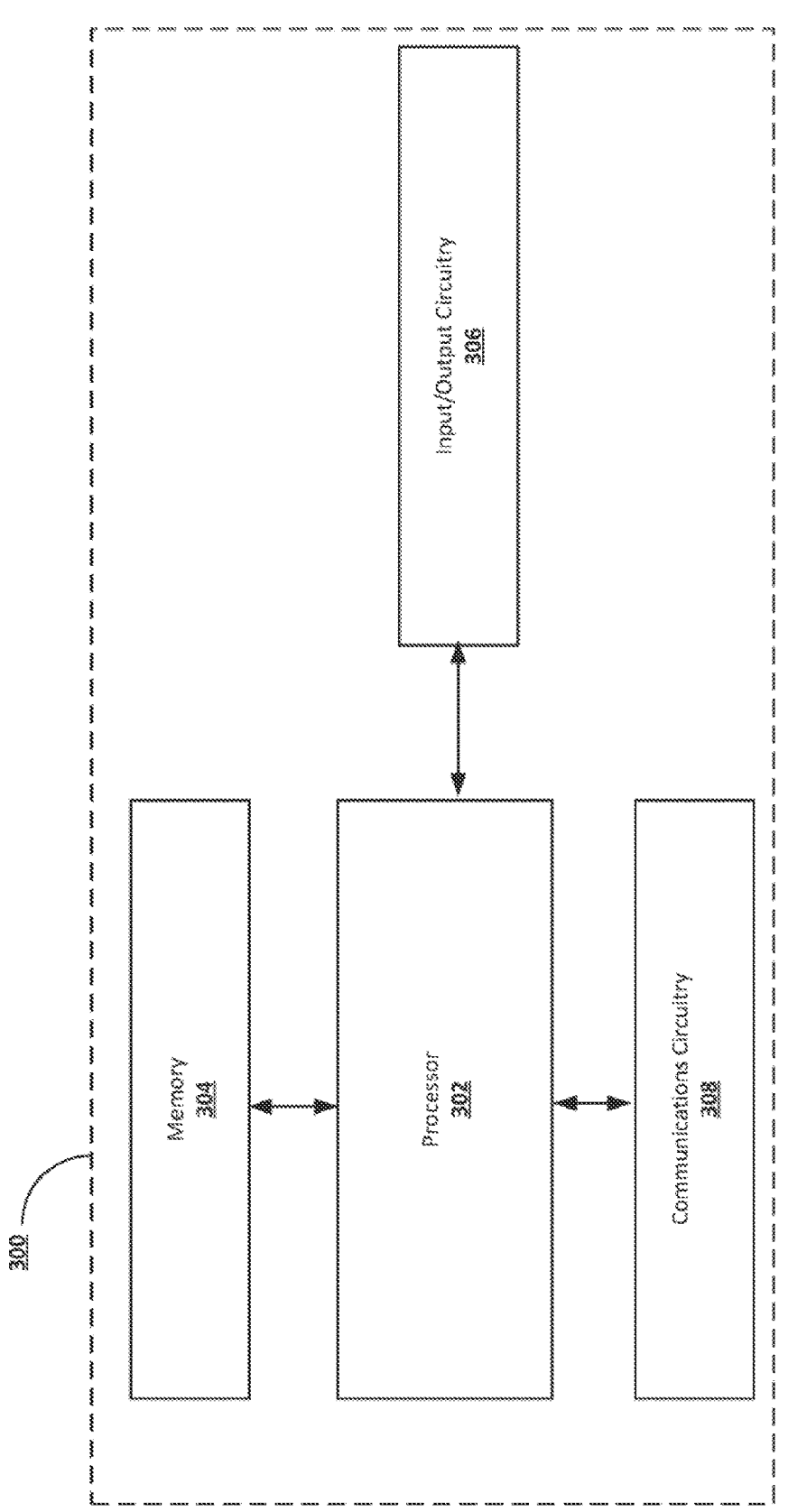
FIG. 3 is a block diagram of an client computing device configured in accordance with one or more embodiments of the present disclosure.

Referring now to FIG. 3, a client computing device 102 may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Figure 4:
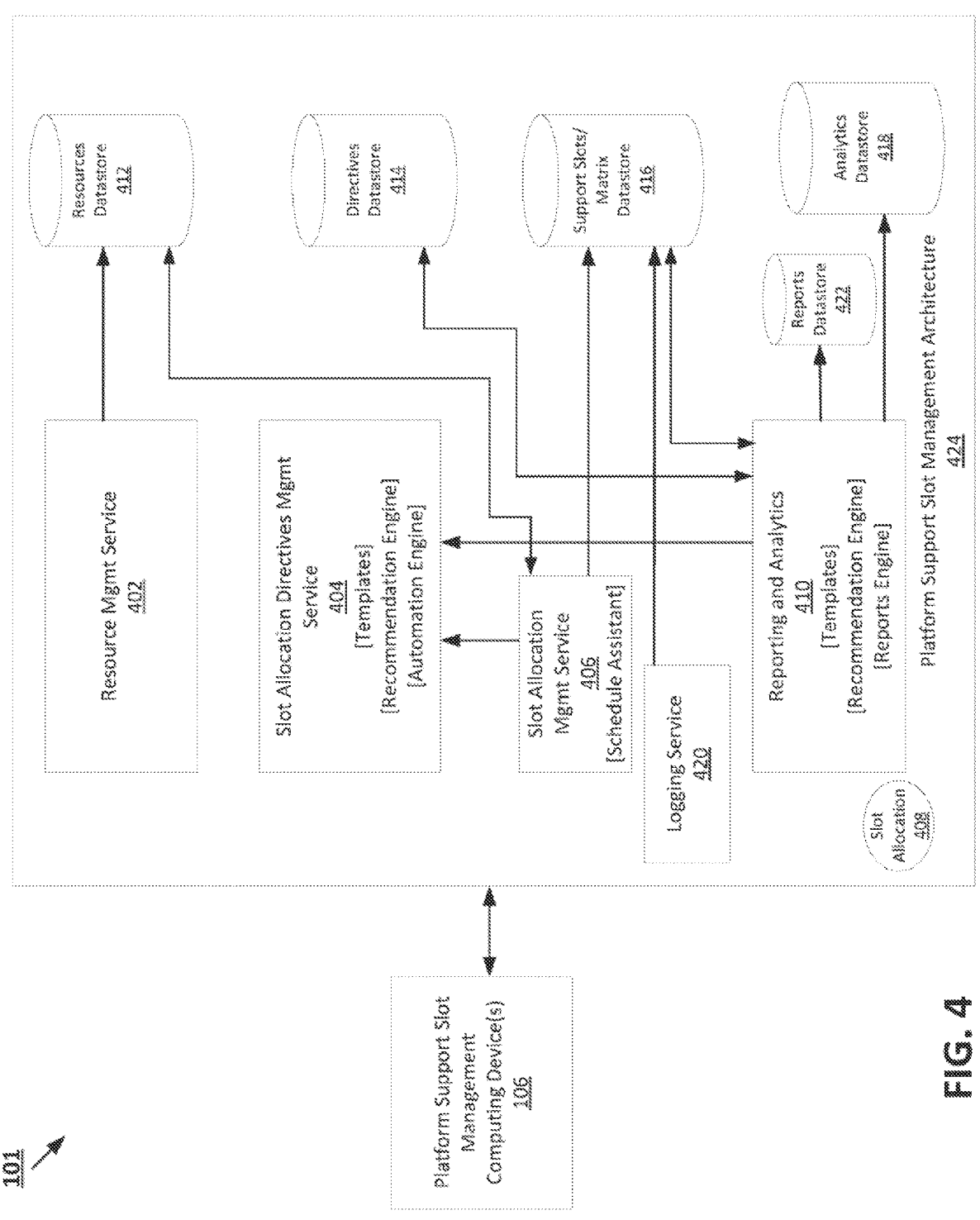
FIG. 4 illustrates an example system architecture in accordance with one or more embodiments of the present disclosure.

Referring now to FIG. 4, an example platform support slot management system 101 is depicted, in accordance with embodiments of the present disclosure. In FIG. 4, various embodiments of the platform support slot management system 101 include a resources management service component 402, a slot allocation directives management service component 404, a slot allocation management service component 406, a slot allocation component 408, a reporting and analytics service component 410, an available resources data store 412, a directives data store 414, a slots/matrix data store 416, an analytics data store 418, a reports datastore 422, and a logging service component 420. Additionally, in one or more embodiments, an exemplary platform support slot management system 101 can integrate with, or be embodied by, one or more platform support slot management computing devices 106 supported by a platform support slot management architecture 424.

In various embodiments, the resource management service component 402 is configured to generate one or more resource data structures or resource groupings comprised of available resources (e.g., human resources or otherwise) for supporting a given service of the application framework. The resource management service component 402 may further be configured to add individual resources to a given resource data structure. The resource data structures may be generated and managed by the resource management service component 402 and stored in the resources datastore 412.

In various embodiments, the resource groupings may be configured by one or more client devices (e.g., 102a-n) or platform support slot management computing devices 106. A resource grouping may be generated for a particular service of an application framework, and, accordingly be associated with a service identifier and one or more resource identifiers that are included in the resource grouping. In some embodiments, a resource grouping may be referred to as a team. A resource grouping administrator (e.g., team admin) can define the resource grouping with configurations as well as metadata, where the metadata includes the set of roles (pre-defined or custom added) each of the resources (e.g., team members) contribute to the resource grouping and also the related service for which each of them can manage service operations. An example resource grouping may be generated by mapping a resource identifier in combination with a role identifier to a resource grouping identifier.

In various embodiments, the slot allocation directives management service component 404 is configured to generate and define directives to which the platform support slot management system strives to adhere. The slot allocation directives management service component 404 may include an automation engine or module/component that enables definition of set of directives according to multiple parameters such as available resources and associated metadata. The directives data may be stored in directives data store 414. The slot allocation directives management service component 404 may further include a directives recommendation engine for generating new directives based on learnings derived from historical directives and other data. The slot allocation directives management service component 404 may further be configured to generate directives templates for use in defining new directives.

In various embodiments, the slot allocation directives may be configured by client devices (e.g., 102a-n) or platform support slot management computing devices 106. A resource grouping administrator may define slot allocation directives that should be adhered to using the slot allocation directives management service component 404. The slot allocation directives can also be configured for the entire resource grouping (e.g., the entire team) or a subset of resources (e.g., a subset of team members) by the resource grouping administrator.

In various embodiments, the slot allocation component 408 is configured to manage allocation of resources to various slots (e.g., time slots for supporting the application framework) of a platform management matrix (e.g., a calendar). Data associated with the slot allocation component is stored in the support slots/matrix datastore 416.

In various embodiments, a resource grouping administrator, using one or more client devices (e.g., 102a-n) or platform support slot management computing devices 106, may configure a platform management matrix comprising an on-call schedule for the resource identifiers associated with a resource grouping. In embodiments, slots of the platform management matrix are distributed among the various resource identifiers of the resource grouping. The slot allocation component 408 manages the platform management matrices and stores them in the support slots/matrix datastore 416. In some embodiments, one a platform management matrix is published (e.g., made available for review by resources associated with resource identifiers within the platform management matrix), computing devices associated with the resource identifiers of the platform management matrix may receive a notification. In embodiments, when the resource grouping administrator is configuring platform management matrices (e.g., schedules), the slot allocation management services 406 fetches the resource directives (e.g., from directives datastore 414) and provides assistance to the resource grouping administrator for balancing the load (e.g., of slot allocations) amongst the resource identifiers (e.g., different team members). This is a proactive configuration time assistance so that the directives are honored broadly amongst the resource identifiers.

In various embodiments, the reporting and analytics service component 410 provides a logging service 420 that collects raw compliance data of compliance against the slot allocations. The raw compliance data is stored for each of the individual resources (e.g., team members) in the support slots/matrix datastore 416. Further, the reporting and analytics service component 410 is configured to provide reports generation at a particular frequency that processes the raw compliance data against the defined directives and generate reports using a reports engine. The reports data is stored in one or more of a reports datastore 422 or analytics datastore 418.

In some embodiments, for reports generation, the reporting and analytics service component 410 retrieves (e.g., or fetches) the directives defined by the resource grouping administrator from the directives datastore 414. These are the directives against which raw data is processed in the next step. Raw compliance data (e.g., for comparison against slot allocations of a platform management matrix) is retrieved from the support slots/matrix datastore 416. This raw compliance data is for each of the individual resource identifiers and is collated to generate raw compliance data for the resource grouping. Based on the comparison of the retrieved directives against the compliance data and the platform management comparison are analyzed using a recommendation engine of the reporting and analytics service component 414. The engine recognized the syntax of directives, parses them and generate key insights for health of the resource grouping. A reports engine of component 414 processes the metrics and generates the reports that get stored in reports datastore 422 (e.g., a file system). It will be appreciated that, while the present description relates to scheduled reports generation, embodiments herein provide for live analytics query execution as well.

Figure 5B:
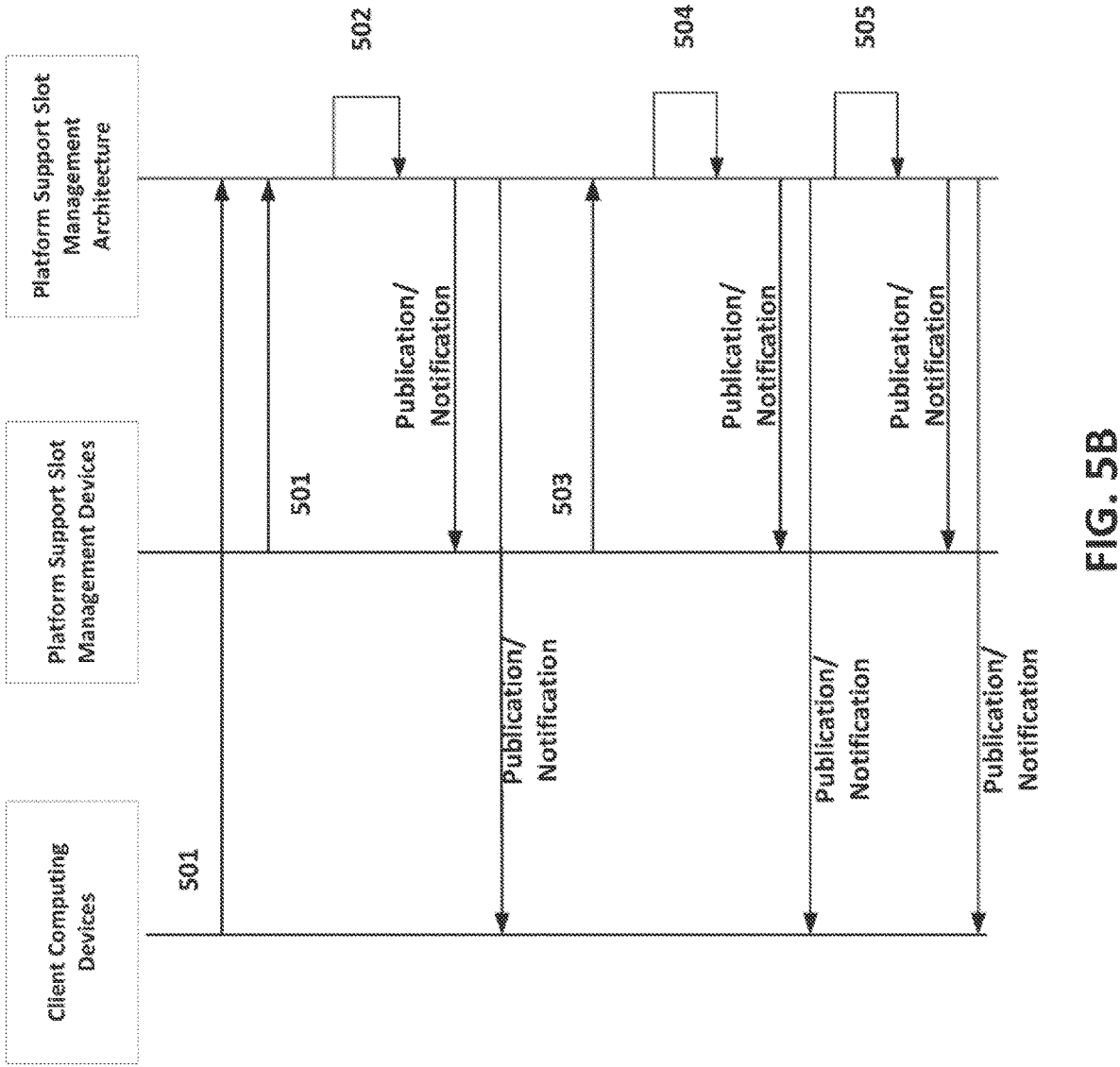

FIGS. 5A and 5B depict example operations for allocating resource identifiers to a platform management or support matrix based on directive data structures, in accordance with various embodiments of the present disclosure. By way of process 500, a platform support slot management system 101 can automatically allocate resource identifiers to platform support matrices in accordance with dynamically changing directive data structures to ensure equitable distribution of the resource identifiers in the platform support matrices while still adhering to the directive data structures.

In some embodiments, the process 500 begins at operation 501, when a platform support slot management system (e.g., by way of platform support slot management computing device 106 or other computing device) receives a first plurality of directive data structures. In some embodiments, the first plurality of directive data structures are received from one or more data stores and/or or more client computing devices (e.g., 102a-n). In some embodiments, each directive data structure includes one or more first support control requirements associated with a supported platform and allocation of resources to a support matrix associated with the supported platform. The support matrix may include multiple slots. In some examples, the support matrix is a calendar for on-call support of requests associated with an application framework supported by the resources of the support matrix. In some embodiments, the one or more first support control requirements comprise one or more of a quantity of resources, one or more resource roles, one or more service identifiers. The one or more first support control requirements may be associated with a directive visibility flag. The one or more first support control requirements may comprise a maximum number of allocations for a given resource identifier in a predefined time period.

In some embodiments, the process 500 continues at operation 502, when a platform support slot management system (e.g., by way of platform support slot management computing device 106 or other computing device) allocates one or more resource data structures of a plurality of resource data structures to one or more of the plurality of slots of the support matrix according to the first plurality of directive data structures.

In some embodiments, the process 500 continues at operation 503, when a platform support slot management system (e.g., by way of platform support slot management computing device 106 or other computing device) receives a slot allocation compliance matrix. In some examples, the slot allocation compliance matrix comprises one or more compliance indications associated with the plurality of slots. The slot allocation compliance matrix comprises data representative of slots corresponding to the support matrix, where each slot includes an indication of whether the resource allocated to a given slot complied with the allocation to the slot (e.g., was the resource present for the duration of the slot).

In some embodiments, the process 500 continues at operation 504, when a platform support slot management system (e.g., by way of platform support slot management computing device 106 or other computing device) applies a trained slot allocation machine learning model to the slot allocation compliance matrix and the support matrix to generate a second plurality of directive data structures. In some examples, the second plurality of directive data structures comprises a second support control requirement associated with the supported platform and allocation of resources to the supported platform. The trained slot allocation machine learning model may be configured to generate the second plurality of directive data structures based on historical learnings associated with historical compliance data and historical support matrices.

In some embodiments, the process 500 continues at operation 505 when a platform support slot management system (e.g., by way of platform support slot management computing device 106 or other computing device) allocates one or more resource data structures of a plurality of resource data structures to one or more of a second plurality of slots of a second support matrix according to the second plurality of directive data structures. In some embodiments, allocating the one or more resource data structures to one or more of the plurality of slots of the support matrix according to the second plurality of directive data structures generates a support matrix that is equitable for each of the one or more data structures within a predefined time period.

In some embodiments, platform support slot management system is configured to generate the one or more resources data structures based at least in part on available resources and resource metadata associated with each available resource. In some examples, the resource metadata comprises resource roles and related services which can be supported by a resource associated with the resource data structure. In some examples, the one or more resources data structures comprises a resource identifier. Each related service is associated with a service identifier.

FIGS. 6A and 6B depict example operations for allocating resource identifiers to a platform management or support matrix based on directive data structures, in accordance with various embodiments of the present disclosure. By way of process 600, a platform support slot management system 101 can automatically allocate resource identifiers to platform support matrices in accordance with dynamically changing directive data structures to ensure equitable distribution of the resource identifiers in the platform support matrices while still adhering to the directive data structures.

In some embodiments process 600 begins at operation 601 when a platform support slot management system (e.g., by way of platform support slot management computing device 106 or other computing device) receives a first slot allocation request associated with a support matrix.

In some embodiments process 600 continues at operation 602 when a platform support slot management system (e.g., by way of platform support slot management computing device 106 or other computing device), based at least in part on a trained slot allocation machine learning model, a slot allocation compliance matrix, the support matrix, and a plurality of directive data structures, allocates one or more resource data structures to one or more slots of the support matrix.

In some embodiments, the plurality of directive data structures comprises one or more of a quantity of resources, one or more resource roles, one or more service identifiers. The plurality of directive data structures may be associated with a directive visibility flag. The plurality of directive data structures may further comprise a maximum number of allocations for a given resource identifier in a predefined time period.

The one or more slots of the support matrix are associated with a duration of network time and one or more service identifiers. The slot allocation compliance matrix comprises data representative of whether one or more resources allocated to a given slot of a support matrix complied with allocation to the given slot.

In some embodiments, allocating the one or more resource data structures to one or more of the plurality of slots of the support matrix according to the plurality of directive data structures generates a support matrix that is equitable for each of the one or more data structures within a predefined time period. In some embodiments the trained slot allocation machine learning model is configured to generate the plurality of directive data structures based on historical learnings associated with historical compliance data and historical support matrices.

FIGS. 7A and 7B depict example operations for multiple training stages of a trained slot allocation machine learning model, in accordance with various embodiments of the present disclosure. By way of process 700, a platform support slot management system 101 may iteratively train a slot allocation machine learning model to provide a robust trained slot allocation machine learning model that can identify optimal slot allocations for resource identifiers in accordance with directive data structures while minimizing non-compliance events associated with the slot allocations.

In some embodiments process 700 begins at operation 701 when a platform support slot management system (e.g., by way of platform support slot management computing device 106 or other computing device) receives a plurality of resource data structures and a plurality of directive data structures from one or more datastores.

In some embodiments, process 700 continues at operation 702 when a platform support slot management system (e.g., by way of platform support slot management computing device 106 or other computing device) generates a first training set comprising the plurality of resource data structures and the plurality of directive data structures.

In some embodiments, process 700 continues at operation 703 when a platform support slot management system (e.g., by way of platform support slot management computing device 106 or other computing device) generates a trained slot allocation machine learning model by training a slot allocation machine learning model, in a first stage, using the first training set.

In some embodiments, process 700 continues at operation 704 when a platform support slot management system (e.g., by way of platform support slot management computing device 106 or other computing device) receives a slot allocation compliance matrix.

In some embodiments, process 700 continues at operation 705 when a platform support slot management system (e.g., by way of platform support slot management computing device 106 or other computing device) generates a second training set comprising the first training set and one or more slots of a support matrix without a compliance confirmation in the slot allocation compliance matrix after the first stage.

In some embodiments, process 700 continues at operation 706 when a platform support slot management system (e.g., by way of platform support slot management computing device 106 or other computing device) trains the trained slot allocation machine learning model in a second stage using the second training set.

In some embodiments, process 700 continues at operation 707 when a platform support slot management system (e.g., by way of platform support slot management computing device 106 or other computing device) applies the trained slot allocation machine learning model to allocate resource identifiers to resource slots.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web components, web services, web microservices, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus comprising one or more processors and one or more storage devices storing instructions that are operable, when executed by the one or more processors, to cause the one or more processors to:

receive a first plurality of directive data structures, each directive data structure of the first plurality of directive data structures comprising one or more first support control requirements associated with a supported platform and allocation of resources to a support matrix associated with the supported platform, the support matrix comprising a plurality of slots;

allocate one or more resource data structures of a plurality of resource data structures to one or more of the plurality of slots of the support matrix according to the first plurality of directive data structures;

receive a slot allocation compliance matrix, wherein the slot allocation compliance matrix comprises one or more compliance indications associated with the plurality of slots;

apply a trained slot allocation machine learning model to the slot allocation compliance matrix and the support matrix to generate a second plurality of directive data structures, wherein the second plurality of directive data structures comprises a second support control requirement associated with the supported platform and allocation of resources to the supported platform.

2. The apparatus of claim 1, wherein the one or more storage devices store instructions that are operable, when executed by the one or more processors, to further cause the one or more processors to:

generate the one or more resource data structures based at least in part on available resources and resource metadata associated with each available resource.

3. The apparatus of claim 2, wherein the resource metadata comprises resource roles and related services which can be supported by a resource associated with the one or more resource data structure.

4. The apparatus of claim 2, wherein the one or more resource data structures comprises a resource identifier.

5. The apparatus of claim 3, wherein each related service is associated with a service identifier.

6. The apparatus of claim 1, wherein the one or more first support control requirements comprise one or more of a quantity of resources, one or more resource roles, one or more service identifiers.

7. The apparatus of claim 6, wherein the one or more first support control requirements are associated with a directive visibility flag.

8. The apparatus of claim 6, wherein the one or more first support control requirements comprise a maximum number of allocations for a given resource identifier in a predefined time period.

9. The apparatus of claim 1, wherein the trained slot allocation machine learning model is configured to generate the second plurality of directive data structures based on historical learnings associated with historical compliance data and historical support matrices.

10. The apparatus of claim 1, wherein the one or more storage devices store instructions that are operable, when executed by the one or more processors, to further cause the one or more processors to:

allocate one or more resource data structures of a plurality of resource data structures to one or more of a second plurality of slots of a second support matrix according to the second plurality of directive data structures.

11. The apparatus of claim 10, wherein allocating the one or more resource data structures to one or more of the plurality of slots of the support matrix according to the second plurality of directive data structures generates a support matrix that is equitable for each of the one or more resource data structures within a predefined time period.

12. The apparatus of claim 1, wherein the slot allocation compliance matrix comprises data representative of whether one or more resources allocated to a given slot of a support matrix complied with allocation to the given slot.

13. A computer-implemented method, comprising:

receiving a first plurality of directive data structures, each directive data structure of the first plurality of directive data structures comprising one or more first support control requirements associated with a supported platform and allocation of resources to a support matrix associated with the supported platform, the support matrix comprising a plurality of slots;

allocating one or more resource data structures of a plurality of resource data structures to one or more of the plurality of slots of the support matrix according to the first plurality of directive data structures;

receiving a slot allocation compliance matrix, wherein the slot allocation compliance matrix comprises one or more compliance indications associated with the plurality of slots;

applying a trained slot allocation machine learning model to the slot allocation compliance matrix and the support matrix to generate a second plurality of directive data structures, wherein the second plurality of directive data structures comprises a second support control requirement associated with the supported platform and allocation of resources to the supported platform.

14. A computer program product, stored on a computer readable medium, comprising instructions that when executed by one or more computers cause the one or more computers to:

receive a first plurality of directive data structures, each directive data structure of the first plurality of directive data structures comprising one or more first support control requirements associated with a supported platform and allocation of resources to a support matrix associated with the supported platform, the support matrix comprising a plurality of slots;

allocate one or more resource data structures of a plurality of resource data structures to one or more of the plurality of slots of the support matrix according to the first plurality of directive data structures;

receive a slot allocation compliance matrix, wherein the slot allocation compliance matrix comprises one or more compliance indications associated with the plurality of slots;

apply a trained slot allocation machine learning model to the slot allocation compliance matrix and the support matrix to generate a second plurality of directive data structures, wherein the second plurality of directive data structures comprises a second support control requirement associated with the supported platform and allocation of resources to the supported platform.

\*   \*   \*   \*   \*